Aug. 10, 1926.
A. F. CRAWFORD
BRAKE OPERATING DEVICE FOR TRAINS
Filed Sept. 30, 1925
1,595,712
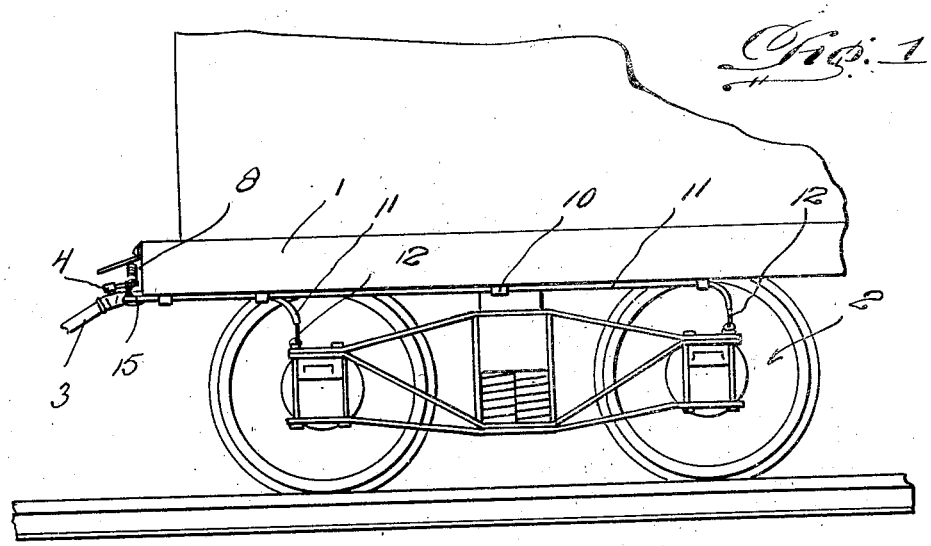
*Fig. 1.*
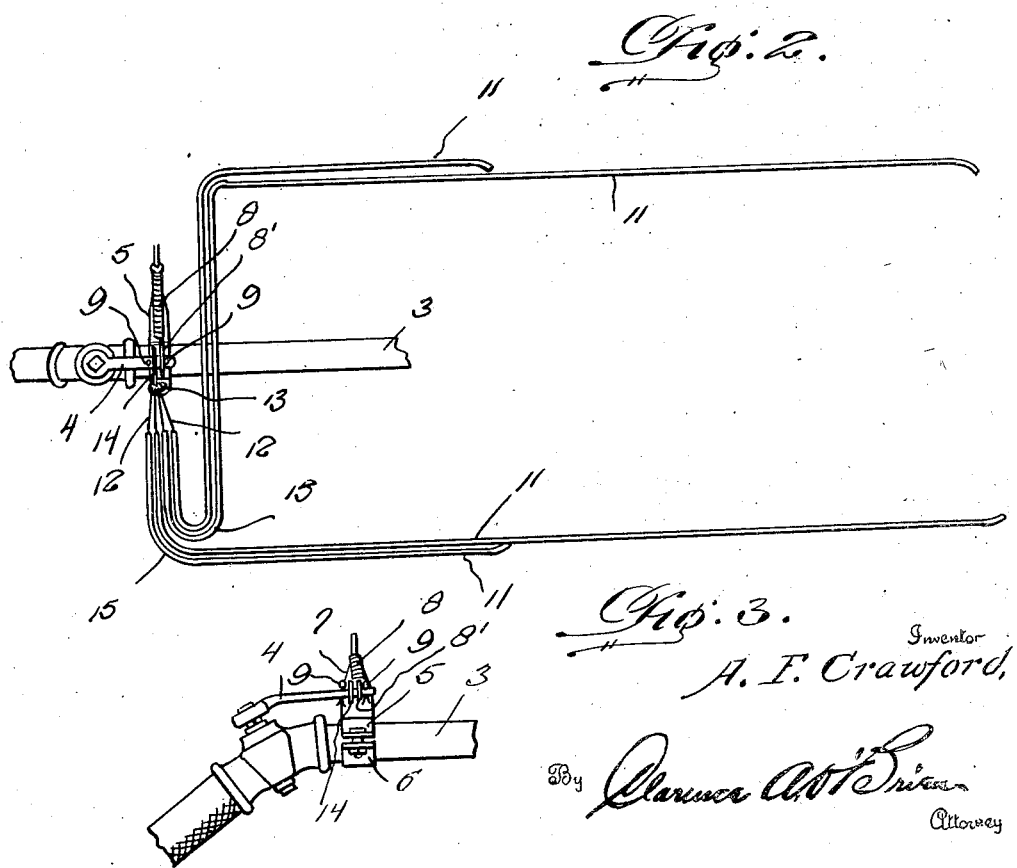
*Fig. 2.*
*Fig. 3.*
Inventor
A. F. Crawford,
By Clarence A. O'Brien
Attorney Patented Aug. 10, 1926.

1,595,712

UNITED STATES PATENT OFFICE.

AARON F. CRAWFORD, OF EVERETT, WASHINGTON.

BRAKE-OPERATING DEVICE FOR TRAINS.

Application filed September 30, 1925. Serial No. 59,535.

This invention relates to an improved railway appliance, and it has reference to a device to be included in the train brake equipment for automatically operating the brakes in case of derailment.

The invention has reference to the disposition of a rotary valve in the air brake pipe, a spring means for normally holding the valve closed, and cable operated means connected with the valve and with one of the car trucks so that in case the truck is derailed, the cables will be operated to open the valve and to allow a reduction in the air pressure and the consequent automatic application of the brakes.

The features and advantages of the invention will become apparent from the following description and drawing.

In the accompanying drawing forming a part of this application and in which like numerals are employed to designate like parts of the same:

Figure 1 is a fragmentary side elevation of a railway car and truck equipped with an invention constructed in accordance with my idea.

Figure 2 is a diagrammatic top plan view of the device.

Figure 3 is a detail side view.

Referring to the drawing in detail the reference character 1 (in Figure 1) designates a side view of one of the side bars of the body, and 2 designates generally the wheel supported truck which has relative movement to the body as is well known. The brake pipe is designated by the reference character 3, and the operating handle of a rotary valve, in this brake pipe, is designated by the reference character 4. In accordance with the present invention a clamp, the parts of which are designated by the characters 5 and 6, is fastened upon the brake pipe at the point shown. The top part 5 of the clamp carries a horizontal arm 7 and a coil spring 8 is attached at its outer end to the corresponding end of the arm and is detachably connected at its opposite end to the operating handle 4 of the valve. In this connection it is to be pointed out, as shown in Figure 3 that the valve handle is formed at longitudinally spaced points with openings through which cotter pins 9 are passed. Moreover the coil spring is formed on its inner end with an elongated loop which surrounds the handle at a point between these cotter pins.

Secured by straps or equivalent means 10 on the side rails of the car body are conduits 11 through which flexible valve operating cables 12 are passed. There are four of these cables, two short ones and two long ones. The two short ones are attached to the front corners of the truck 2 and the two long ones are attached to the rear corners, considering the left hand end of the car, the front of Figure 1. All of the forward ends of the cable are connected with a ring 13 and this ring is in turn connected with an elongated link 14.

Under normal circumstances the coil spring exerts a yieldable pull upon the valve handle 4 to maintain the valve closed. In the event that the car on which the device is installed is derailed and the wheels of the truck jump the track, it is obvious that one or more of the flexible cables will be pulled upon. In Figure 2 it will be noted that the conduits have properly bent portions 15 to dispose all of the cables on one side of the valve handle. Accordingly the valve handle will be pulled in a direction from left to right to open the valve against the tension of the spring. Under abnormal conditions the pull will be such as to shear off the cotter pins and to detach the cables from the valve handle. The coil spring will also become disconnected at the same time and thus the valve will remain open until closed by hand. The moment there is a reduction in the air pressure in the brake pipe line, the brakes will be automatically applied, thereby reducing the severity of the accident. It is, of course, understood that there is sufficient play in the cable to allow for the normal degree of relative movement between the truck and body of the car. The shearing operation described only occurs when the movement is abnormal.

It is believed that by considering the description in connection with the drawings, persons familiar with inventions of this class will be able to attain a clear understanding of the same, therefore a more lengthy description is thought unnecessary.

While the preferred embodiment in the invention has been shown and described it is to be understood that minor changes coming within the field of invention claimed may be resorted to if desired.

I claim:—

An automatic train stopping device of the class described comprising, in combination, a car body, a wheel supported truck connected with said body and movable with respect thereto, an air pipe mounted upon said body, a valve in said air pipe, a clamp detachably mounted upon said pipe, said clamp being composed of separable sections, one of which is provided with an extension forming an arm, a spring anchored at its outer end to the corresponding end of said arm, said valve including a rotary part having a handle, the inner end of the spring being connected with said handle, a plurality of flexible pull cables connected with the truck, and encasing conduits for said cables mounted upon said car body.

In testimony whereof I affix my signature.

AARON F. CRAWFORD.